Figure 1:
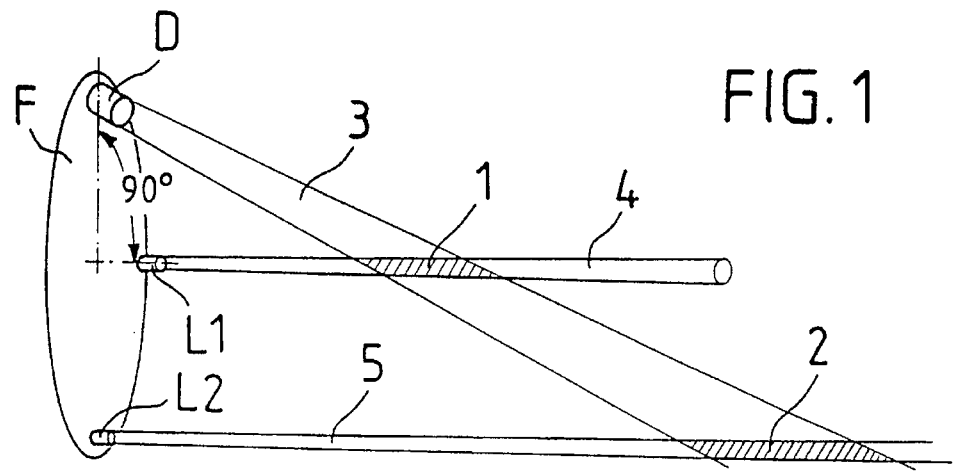

United States Patent [19]

Sepp et al.

[11] Patent Number: 5,601,024
[45] Date of Patent: Feb. 11, 1997

[54] OPTICAL PROXIMITY FUSE

[75] Inventors: Gunther Sepp, Ottobrunn; Walter Hermann, Kirchseeon; Richard Benedikter, Putzbrunn, all of Germany

[73] Assignee: Daimler-Benz Aerospace AG, München, Germany

[21] Appl. No.: 627,397

[22] Filed: Nov. 1, 1990

[30] Foreign Application Priority Data

Nov. 14, 1989 [DE] Germany .......................... 39 37 859.4

[51] Int. Cl.⁶ .................................................. F42C 13/02
[52] U.S. Cl. .................................................. 102/213
[58] Field of Search .................................................. 102/213

[56] References Cited

U.S. PATENT DOCUMENTS

| | | | |
|---|---|---|---|
| 4,409,900 | 10/1983 | Currie | 102/213 |
| 4,532,867 | 8/1985 | Mitchell | 102/213 |
| 4,709,142 | 11/1987 | Dahl | 102/213 |
| 4,896,606 | 1/1990 | DeCoi | 102/213 |

*Primary Examiner*—Charles T. Jordan
*Attorney, Agent, or Firm*—McGlew and Tuttle

[57] ABSTRACT

The present invention is directed to an optical proximity fuse for missiles with laser transmitters and optical receivers, whose optically bundled beam paths are oriented in such a way at a small angle to the direction of flight that they intersect in predetermined measuring segments, wherein the radiation reflected from objects in these measuring segments is utilized for deriving the firing pulse, wherein at least two laser transmitters oriented at angles different from each other and a common optical receiver are arranged at different points of the front side of the missile. The measuring segments where the transmitter beam paths intersect the receiver beam path lie at different distances from the missile and at differing side spacings from the longitudinal axis of the missile, wherein the measuring segment lying closer to the missile corresponds to the predetermined target segment. The laser transmitters are modulated at identification response codes differing from each other. Means for discriminating between these identification response codes are provided in the receiver circuit. A firing signal is generated only if both the transmitter response codes are present at the receiver within a predetermined time interval and at receiver intensities lying within predetermined ranges. The instant of the firing signal is derived in a predetermined manner from the chronological sequence and the chronological spacing of the two signal response codes received.

10 Claims, 3 Drawing Sheets

OPTICAL PROXIMITY FUSE

The present invention deals with an optical proximity fuse for missiles with laser transmitters and optical receivers, whose optically bundled radiation beam paths are oriented at a small angle to the direction of flight in such a way that they intersect at predetermined measuring sections, wherein the radiation reflected by objects in these measuring sections is evaluated for derivation of the firing pulse.

Such a device is particularly suitable for missiles which, for instance, comprise a twin-shaped charge and have to be detonated at a relatively large distance, meaning more than approximately 0.5 m from the target which has to be attacked.

It is known to equip missiles with a laser which is controlled by an oscillator and which emits light pulses in flight direction at regular intervals. Light beam shares reflected there from the target are received by a detector, whose output signals, after amplification in an alternating voltage amplifier, are fed to two phase controlled rectifiers which receive an instantaneous operating reference signal or one phase delayed through 90° emanating from the oscillator. The outputs of the two phase controlled rectifiers are compared with each other in a circuit, wherefrom a distance or spacing value for triggering the fuse corresponding to the respective distance of the target is obtained.

Herein, however, the detector is unable to discriminate between the reflected light beam share emanating from a target to be attacked or from an obstacle. During flight to the target to be attacked, certain individual obstacles, such as foliage, stalks in a cornfield, etc. (called masks in the following), can lead to reflections of the emitted laser beams which, however, cannot be allowed to cause premature firing of the warhead.

It is the task of the present invention to create an optical proximity fuse for a missile with improved masking security characterized by a low construction expenditure and a small required installation volume.

The device of the invention achieves the advantage of a considerably reduced quantity of electronics, since no continuous distance measurement occurs. Rather two triangulation measurements are performed at two points in the direction of flight and offset laterally thereto from each other.

Two measuring sections in preselected sections or segments are generated by the points of intersection of the laser beams with the field of view of the detector which are arranged to be offset sideways to each other as well as in the direction of flight from each other, all of which results from an appropriate arrangement and alignment or orientation of the two laser transmitters and of the receiver at the periphery of the missile.

Adequate geometric measuring accuracy can be achieved through the use of continuous wave diode lasers and Selfoc(self-focusing) lenses which permit a narrow laser beam as well as by an appropriate design of the receiver optics of the detector which makes possible a narrow field of view. Through the use of the known as such amplitude modulation/continuous wave process, otherwise used for continuous distance measurements, one attains the advantage of a high signal/clutter ratio at low cost as well as reduced requirements of phase stability because of the unnecessary distance evaluation.

When approaching the target, because of the time offset reception of reflected laser beam shares which emanate from the two measuring sections during target approach, one signal detector is sufficient for the two lasers which are actuated by the Q- and $\overline{Q}$-outputs of the flip-flops downstream of the oscillator. The switches which are also actuated by these two outputs of the flip-flops, enable a simple separation of the signals corresponding to the reflected light beam shares which have different polarities for the two measuring sections, wherein the following signal properties for triggering a firing signal are possible in a random linkage or combination:

the intensity of the signals emanating from the detector,
the length of the signals,
the intensity ratio of these signals,
the length ratio of these signals,
the chronological sequence of the two signals with due reference to the known flight velocity, wherein the linkage of all or several of these signal properties can be utilized for generating a firing signal so that it occurs at the desired predetermined distance from the target, independent of the position of possibly existing masks encountered along the path of the missile.

In another embodiment, the separation of the signals of the two emitters is accomplished by modulating the amplitude of the one emitter at a specific frequency and the second emitter at another frequency.

An electronic frequency separating filter is then placed downstream of the receiver which switches signals of the two frequencies respectively to different outputs.

In the following, the invention is described with particularity with the help of a drawing showing the advantageous embodiments thereof.

Figure 2:
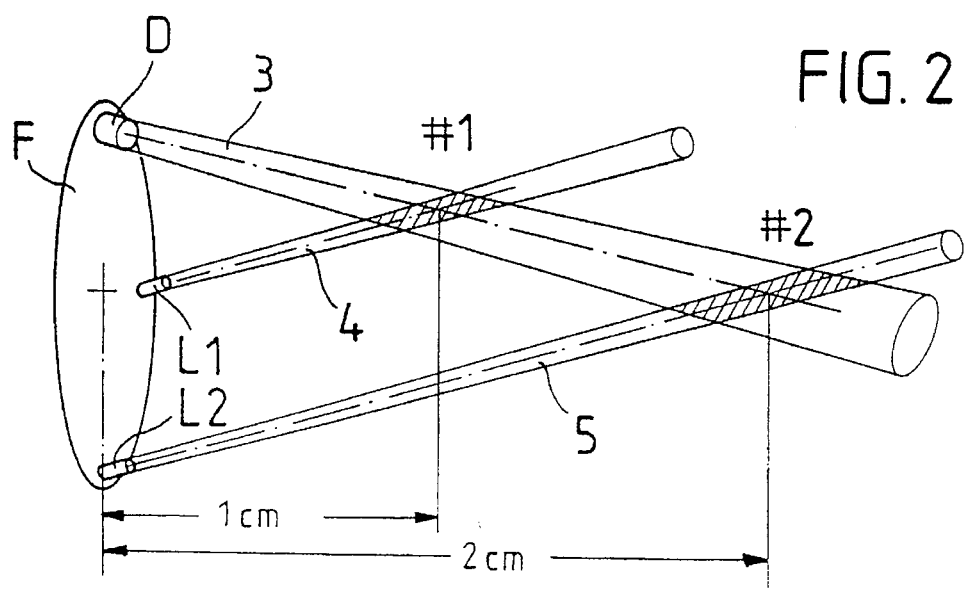
Figure 3:
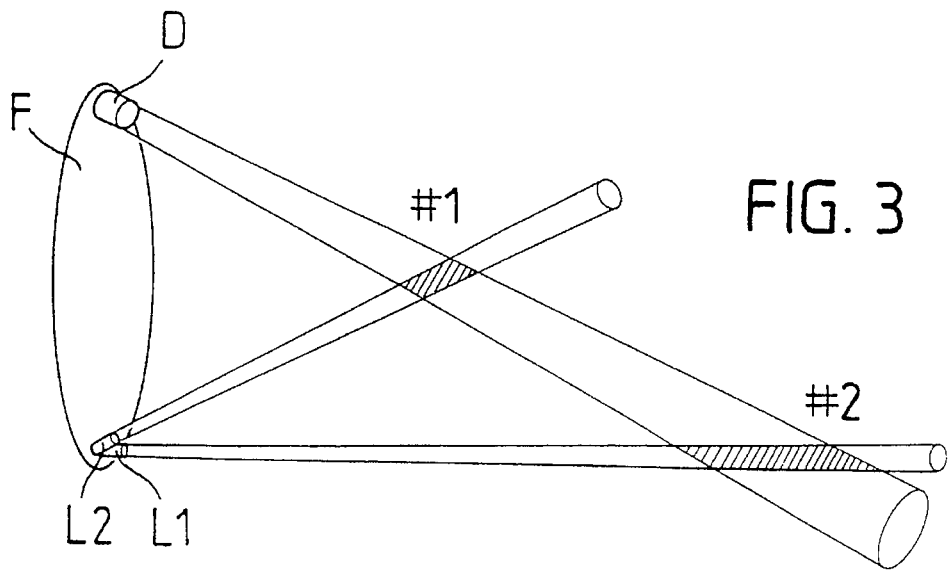
Figure 4:
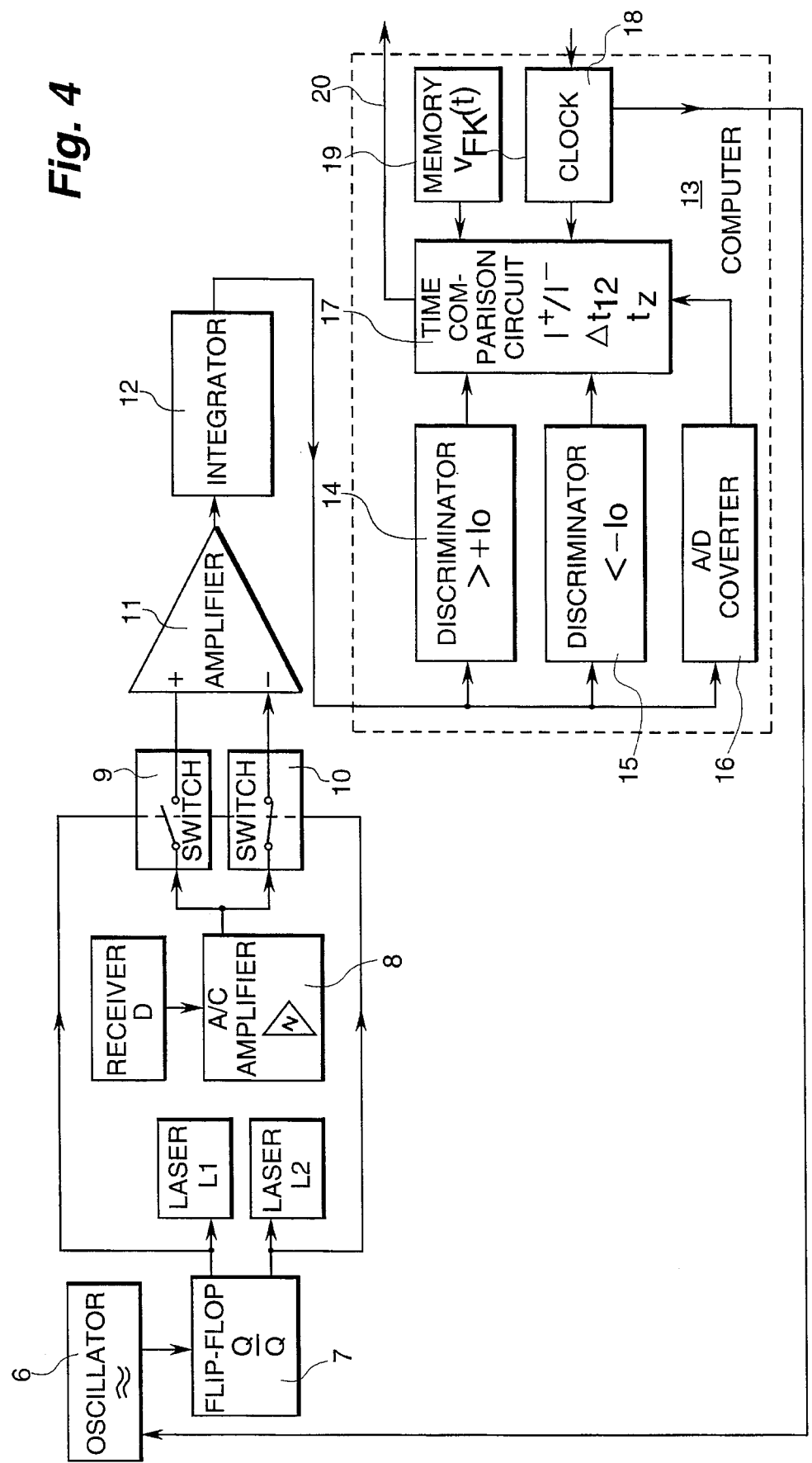
Figure 5:
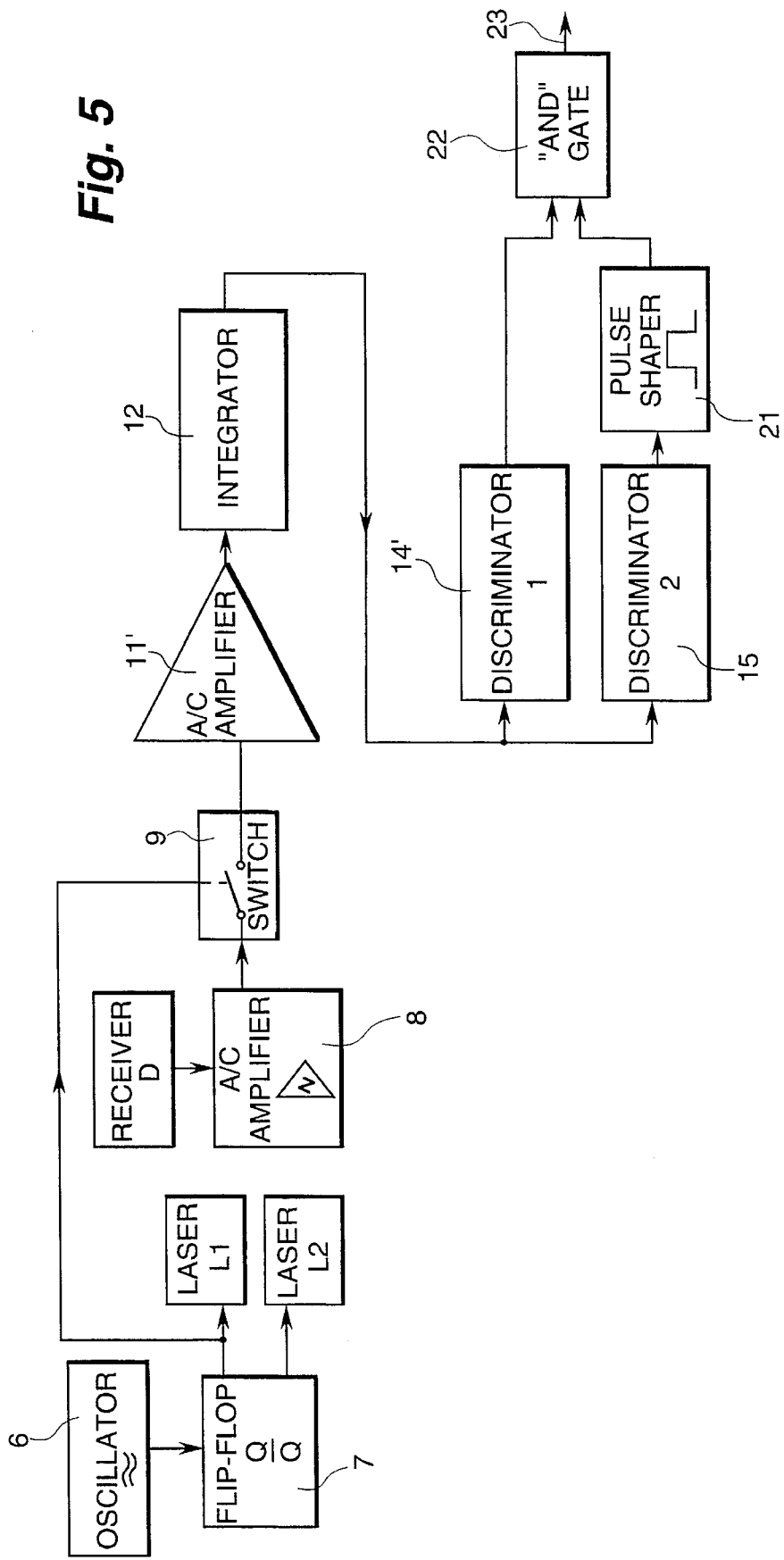

In the drawings:

FIGS. 1, 2 and 3 are two sections through the front segment of a missile with laser transmitters and the receiver, and FIGS. 4 and 5 are two embodiments of suitable circuit arrangements for generating a firing signal.

FIGS. 1 and 2, respectively, show a cross section F through the front segment of a missile, with respectively one receiver D being arranged at its periphery, whose field of view (or receiving bundle) is designated by the numeral 3. A first laser transmitter L1 offset through 90° to the receiver D is also arranged at the periphery of the missile, which transmitter emits a light beam 4. A second laser transmitter L2 which emits a light beam 5 is arranged to be offset by 180° with respect to receiver D.

In the embodiment of the optical proximity fuse of the invention shown in FIG. 1, the laser transmitter L2 is aligned in such a way that the light beam 5 emitted by it extends essentially parallel to the longitudinal axis of the missile, while the receiver D is arranged in such a way at an angle to the longitudinal axis of the missile so that its field of view 3 is penetrated by the laser beam 5 in an area which forms a measuring section or segment 2 at approximately twice the firing distance. The laser transmitter L1 is also arranged at an angle to the longitudinal axis of the missile in such a way that the light beam 4 emitted by it penetrates the field of view 3 of the receiver D in an area which forms a measuring section 1 lying at approximately the predetermined firing distance.

Due to the selected measuring geometry, the two measuring sections or segments 1, 2 are offset with respect to each other in the flight direction as well as being offset to each other with respect to the longitudinal axis of the missile, wherein both measuring segments are arranged to be not substantially outside of the cylinder in space formed by the extension of the missile cross section F, meaning they are arranged in the effective region of the missile warhead.

In the embodiment shown in FIG. 2, the two laser transmitters L1 and L2 and the receiver are arranged at the periphery of the missile corresponding to the embodiment shown in FIG. 1, wherein, however, the measuring segments 1 and 2 formed here by the intersection points with the field of view 3 of the receiver assume a somewhat different position. The laser transmitter L2 herein is arranged at an angle to the longitudinal axis in such a way that the light beam 5 emitted by it intersects the field of view 3 of the receiver D in a region approximately in the longitudinal direction of the missile axis and there forms a measuring segment or section 2. The laser transmitter L1 is arranged at such an angle so that the light beam 4 emitted by it intersects the field of view 3 of the receiver D in a second region which forms the measuring segment 1 approximately at the intended firing distance. In this case, the measuring segments 1 and 2 are also located not substantially outside of the space bounded by the cross section F ahead of the missile, wherein they are offset to each other in flight direction as well as laterally.

FIG. 3 also shows a cross section F through the front segment of a missile, with two laser transmitters L1 and L2 arranged together at the same point on the periphery of the missile, being located essentially diametrically opposite the receiver D. Here again as in FIG. 1, the measuring segment 1 lies on the extension of the missile's longitudinal axis at approximately the intended firing distance and the measuring segment 2 at approximately twice the firing distance and, thus, in view of the geometric circumstances offset approximately sideways with respect to the missile radius.

The two laser transmitters L1 and L2 are now actuated with a phase shift of 180° by a common oscillator with a downstream flip-flop so that they alternately emit light pulses in the flight direction. If the missile now approaches a target to be attacked, then, upon the measuring segment 2 arriving at the target, a portion of the emitted laser beam 5 is reflected and received by the receiver D. If the measuring segment 1 now also arrives at the target after a preset time period, which is a function of the spacings of the two measuring segments 1 and 2 and of the flight velocity, a portion of the light beam emitted by the laser transmitter L1 is reflected and also received by the receiver D. The evaluation circuit located downstream of the receiver D (which will be described in detail herein-after) determines the presence of these two signals and generates a firing signal when the missile arrives at the target with the measuring segment 1 or prior to the target distance falling below the distance of the measuring segment 1 and, thus, below the desired firing distance.

It is assumed for the considerations which follow, that a vertical plane through the center of the measuring segment 1 has a spacing of 1 m to the plane containing the receiver and the two laser transmitters and that the distance of a vertical plane through the center of the measuring segment 2 from a plane containing the detector and the two lasers amounts to 2 m.

Two embodiments for suitable circuit arrangements which serve for actuation of the two lasers as well as for the evaluation of the signals received by the receiver and with this for generation of a firing signal are shown in FIGS. 4 and 5 in the form of block circuit diagrams.

An oscillator is designated with the numeral 6 in FIG. 4, with a flip-flop 7 being switched downstream of said oscillator, whose Q-output actuates the laser L1, and whose $\overline{Q}$-output actuates the laser L2 with a phase shift through 180° so that light pulses are alternately emitted by the two lasers essentially in the direction of flight. An A/C amplifier 8 is switched downstream of the receiver D, which receives the reflected light beam shares of the two measuring segments 1 and 2; the output of this amplifier is connected with two switches 9, 10, for instance, two FET-switches (field effect transistor) which again are in connection with the Q- and $\overline{Q}$-outputs of the flip-flop 7 and are opened and closed in phase with the actuation of the two lasers L1, L2. This corresponds to a phase controlled rectifier with full-wave rectification. A differential amplifier 11 is located downstream of the switches 9, 10, to whose positive input, for instance, the signal allowed to pass through the switch 9 is supplied, and to whose negative input the signal of the other switch 10 is supplied. Since when approaching the target only one output signal occurs at the same instant from the receiver D (measuring segment 1 or measuring segment 2), the output signal of the amplifier 11 is positive or negative so that the circuitry can determine from which measuring segment the signal emanates.

After passing through an integrator 12, the signal is supplied to a computer 13 and processed therein, with the computer comprising a first discriminator 14 for the positive signal and a second discriminator 15 for the negative signal. Both signals must have a minimum intensity, meaning they have to exceed a certain threshold value Io, wherein the signal emanating from the measuring segment 1 must, according to the missile's velocity, arrive by a predetermined and thus known time period after the signal emanating from the measuring segment 2. This determination is made by the time comparison circuit 17 which furthermore is connected to a clock 18 which begins to run when the missile is launched as well as being in connection with memory 19 for the time dependent flight velocity.

An A/D (analog-to-digital) converter which is designated by 16 is in connection with the integrator 12 as well as with a time comparison circuit which thus also determines and evaluates the intensity ratio of the two signals emanating from the measuring segments 1 and 2.

If the time criterion, which will be explained in more detail hereinafter, for the arrival of the two signals is satisfied, the time comparison circuit 17 generates a firing signal in the line 20 for triggering the warhead.

In the embodiment of the even simpler circuit shown in FIG. 5, actuation of the two lasers L1, L2 occurs as described in accordance with FIG. 4. The switch 10 is eliminated and the differential amplifier 11 is replaced by an A/C amplifier 11'. Only the two discriminators 14, 15 and the pulse shaper 21, and the "AND"-gate 22 correspond to the computer 13. The outputs of the discriminators 14, 15 are connected with the AND-gate 22, wherein a pulse shaper 21 is switched downstream of the discriminator 14. Its delay and its pulse duration are adjusted in such a way that, with routine target approach, the "AND"-gate supplies the firing pulse.

Thus, a firing signal is always triggered if the detector D responds twice within a specific time interval, wherein the two intensities must lie above a threshold value (the discriminator threshold). Additionally, it can be assumed that the intensity of the signal emanating from the measuring segment 1 is approximately four times as high as the intensity of the signal emanating from the measuring segment 2 (proportional to the square of the ratio of the two assumed distances of 1 m or 2 m) and on the assumption that the two light beams strike points of the target to be attacked which have approximately the same albedo. The time comparison circuit can evaluate the intensity ratio and can use it as an additional criterion in the generation of the firing signal.

During a normal target approach, meaning if no object masks arise before the target, the firing signal is triggered when the following condition is satisfied:

$$t(S1)-t(S2)=1,$$

wherein t is measured in units of $1\ m/v_{FK}$ and the firing instant is $t_z=t(S1)$, with FK designating the missile.

If now mask objects, which do not extend across the entire lateral spacing of the two measuring segments 1 and 2, occur during flight of the missile, meaning individual leaves, etc., which, on the average, are smaller than the lateral spacing of the measuring segments from each other (meaning: less than half the missile diameter), then the receiver responds only once within a specific time span (coincidence window), since the mask covers either the measuring segment Z or the measuring segment 2, so that a light beam share is reflected only once (if the mask, however, covers both measuring segments, then an optical sensor of this type can basically not discriminate this from the target to be attacked), The time criterion for the absence of a target amounts thus to $[t(S1)-t(S2)]>\Delta t_k$, wherein a value as small as possible for the coincidence window $\Delta t_k$ must still be determined. As long as this criterion is satisfied, even several mask objects can follow at randomly small time spans one upon another in one and the same measuring segment. Herein, however, it must be assured that respectively the last signal instant which has occurred must be taken into account, meaning the time comparison circuit must perform a signal "updating."

Neglecting the angle of attack and the spin of the missile, the least spacing of two consecutive signals from the measuring segment 2 corresponds to the spacing of the measuring segment 2 from the missile (minus the measuring region depth, meaning the overlapping region or the depth of field or image definition), provided the light beam emanating from the laser transmitter L2 extends essentially in the direction of flight (FIG. 1). In spite of the mask object leaving the measuring segment 1, it continues to block the laser beam of the laser L2 until the missile has flown through the area of the mask.

This applies to the measuring segment 1 only if the mask reaches up to nearly the measuring segment 2, meaning if we are dealing with a large mask object. If the mask, however, extends only up to the edge of the measuring segment 1 on the side of said measuring segment 1 facing the measuring segment 2, meaning we are dealing with a small mask object, the laser beam extending in an oblique manner is again immediately exposed as soon as the mask has again left the measuring segment 1 (with due regard to the image definition). Thus, the following values apply for the minimum spacings of consecutive signals:

| SIGNALS FROM MEASURING SEGMENT | APPROXI- MATELY | WITH DUE REGARD TO THE OVERLAP REGION |
| --- | --- | --- |
| 1 | 0 m | 0 m + Image Definition Region |
| 2 | 2 m | 2 m − Image Definition Region |

Since now the triggering of the firing must be caused by the target to be attacked by means of the two named S1- and S2- signals with due regard to the above time criterion, both measuring segments must supply one signal respectively. The mask density, therefore, must not be allowed to be as large in proximity of the target, that measuring segment 1 or measuring segment 2 are continuously completely blocked. Therefore, the following applies to the allowable minimum distance between two masks lying in the direction of flight of the missile which are consecutively acquired by the laser beam 5 of the laser L2: 2 m for the selected embodiment example. The allowable minimum distance for the measuring distance 1 amounts accordingly, depending upon the position and the size of the mask, to between 0 m and 1 m.

If now one takes into account the spin and the angle of attack of the missile, then an existing mask appears to be smaller than it is in actual fact, whereby also the minimum spacing of two masks encountered, for instance, before the measuring segment 2 is correspondingly reduced. The same effect is also achieved by a reduction in the cross section of the emitted laser beams and by an increase of the parallax between the laser transmitters and the receiver, meaning that thereby a smaller overlap region is formed.

In this case, the arrangement shown in FIG. 2 is particularly expedient since especially small masks are again very rapidly left behind by the laser beams. The lateral spacing of the two measuring segments from each other is however herein somewhat smaller than in the embodiment shown in FIG. 1, so that also the maximum size of the masks is limited, since one single mask must not be allowed to cover or obscure both measuring segments.

Other geometric intermediate positions of the two measuring segments are conceivable depending on practicality, meaning the actually existing or occurring masks, the spin and the angle of attack conditions of the missile. The measuring geometry shown in FIG. 3 is a particularly good compromise since herein the two laser transmitters are arranged at a common point, meaning in a common housing which considerably reduces the costs.

We claim:

1. Optical proximity fuse of a missile with laser transmitters and optical receivers, whose beam paths bundled by optical means are oriented in such a way at a small angle to the direction of flight that they intersect in predetermined measuring segments, wherein radiation reflected from objects in these measuring segments is evaluated for derivation of a firing pulse, characterized in that at least two laser transmitters oriented at angles differing from each other and a common optical receiver are arranged at different points on a front side of the missile, that the measuring segments in which a first and a second transmitter beam path intersects a receiver beam path lie at different spacings from the missile and at different side distances from a longitudinal axis of the missile, wherein the measuring segment of the first transmitter beam path closer to the missile corresponds to a predetermined target segment, that the laser transmitters are modulated with identification response codes differing from each other, that means for discrimination of the identification response codes are provided in a receiver circuitry, and that a firing signal is only generated if both transmitter identification response codes are present at the receiver within a predetermined time interval and with receiving intensities lying within predetermined ranges, and that the instant of the firing signal is derived in a predetermined manner from the chronological sequence and the chronological spacing of the two signal identification response codes received.

2. Optical proximity fuse according to claim 1, characterized in that a first said laser transmitter is arranged at the periphery of a missile, that the second said laser transmitter is arranged at a point at the periphery of the missile which is essentially offset through 90° with respect to the first laser transmitter, and that the receiver is arranged at the periphery of the missile essentially offset through 180° with respect to the second laser transmitter.

3. Optical proximity fuse according to claim 1, characterized in that the receiver is arranged at a point at the periphery of the missile offset essentially by 180° to the laser transmitters arranged at the same point at the periphery of the missile.

4. Optical proximity fuse according to claim 1, characterized in that two said laser transmitters and one said receiver are oriented in such a way to each other that the light beam of first said laser transmitter intersects the field of view of the receiver in a first region which constitutes a first measuring segment (1), that the light beam of a second said laser transmitter intersects the field of view of the receiver in a second region which constitutes a second measuring segment (2) offset in the flight direction of the missile and laterally with respect to the first measuring segment and that both measuring segments (1, 2) lie not considerably outside of the extension of the cross section defined by the periphery of the missile.

5. Optical proximity fuse according to claim 4, characterized in that the first measuring segment (1) lies on the longitudinal axis of the missile and that the second laser transmitter is aligned to be parallel to the longitudinal axis of the missile.

6. Optical proximity fuse according to claim 4, characterized in that the measuring segment (2) lies in the direction of the longitudinal axis of the missile approximately at twice the firing distance.

7. Optical proximity fuse according to claim 1, characterized in that said fuse comprises circuitry with an oscillator and a flip-flop by means of which a first one of two said laser transmitters is being acted upon by an amplitude modulated signal and a second one of the two said laser transmitters is being acted upon by a signal whose phase has been shifted in push-pull action through 180°.

8. Optical proximity fuse according to claim 7, characterized in that the circuitry comprises an A/C amplifier located downstream of a detector of the receiver, as well as two switches connected with the A/C amplifier which are actuated by the flip-flop of the oscillator in the same cycle as the corresponding lasers of the laser transmitters, as well as comprising a differential amplifier downstream of the switches, downstream of which an integrator is placed, also comprising a computer for generating the firing signal, to which computer the signals of the integrator are supplied, wherein the computer contains two discriminators for determination of the signals supplied thereto and an analog-digital converter for conversion of these signals for an intensity comparison of the signals, as well as a time comparison circuit, a clock, and a memory for the time dependent velocity of the missile.

9. Optical proximity fuse according to claim 7, characterized in that the circuitry comprises an A/C amplifier, as well as a switch connected to the A/C amplifier which is actuated by the flip-flop of the oscillator in the same cycle as one of the two lasers, as well as comprising a second A/C amplifier with downstream integrator located downstream of the switch, whose signal is fed to two discriminators, whose outputs are fed to an "AND"-gate for generation of the firing signals, wherein a pulse shaper with adjustable delay and adjustable pulse duration is placed downstream of one discriminator.

10. Optical proximity fuse according to claim 7, characterized in that one of the two laser transmitters is amplitude modulated with a specific frequency and the second transmitter with a frequency deviating therefrom, and that a frequency separating filter for differentiating between the echo signals of the two transmitters is placed downstream of the receiver.

\* \* \* \* \*